(12) United States Patent
Chang et al.

(10) Patent No.: US 11,386,019 B1
(45) Date of Patent: Jul. 12, 2022

(54) DATA PROTECTION METHOD AND STORAGE DEVICE

(71) Applicant: MEDIATEK Inc., Hsin-Chu (TW)

(72) Inventors: Yu-Tien Chang, Hsinchu (TW);
Ching-Ming Chen, Hsinchu (TW);
Wei-Hsun Lin, Hsinchu (TW);
Lin-Ming Hsu, Hsinchu (TW);
Tsung-Wei Hung, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/223,062

(22) Filed: Apr. 6, 2021

(51) Int. Cl.
*G06F 12/14* (2006.01)
*G06F 13/16* (2006.01)
*G06F 12/02* (2006.01)
*G06F 12/0891* (2016.01)

(52) U.S. Cl.
CPC ...... *G06F 12/1441* (2013.01); *G06F 12/0238* (2013.01); *G06F 12/0891* (2013.01); *G06F 12/1466* (2013.01); *G06F 13/1673* (2013.01)

(58) Field of Classification Search
CPC ............. G06F 12/0238; G06F 12/0891; G06F 12/1441; G06F 12/1466; G06F 13/1673
See application file for complete search history.

(56) References Cited

U.S. PATENT DOCUMENTS

| 8,397,083 | B1* | 3/2013 | Sussland | H04L 9/0894 380/278 |
| 9,471,812 | B2* | 10/2016 | He | G06F 12/1441 |
| 10,534,726 | B2* | 1/2020 | McHugh | G06F 12/1466 |

* cited by examiner

*Primary Examiner* — Aracelis Ruiz
(74) *Attorney, Agent, or Firm* — McClure, Qualey & Rodack, LLP

(57) ABSTRACT

The present invention discloses data secure method, applied to a storage device, and performed by a controller of the storage device. The data secure method comprises: receiving a buffer clear command from an external processing unit, wherein the buffer clear command indicates that a first secure area corresponding to a first physical address range of a buffer memory of the storage device is required to be cleared, and a first secure key is corresponding to the first secure area for accessing the first secure area; and in response to the buffer clear command, configuring a secure unit of the storage device to cause the secure unit to use one or more second keys different from the first secure key when accessing the first physical address range.

8 Claims, 3 Drawing Sheets

DATA PROTECTION METHOD AND STORAGE DEVICE

BACKGROUND OF THE INVENTION

Field of the Invention

The invention relates to a data protection method and a storage device.

Description of the Related Art

Memory, including volatile memory and non-volatile memory, such as DRAM, SRAM, eMMC, USB, is widely applied for buffering data in various electronic devices. For example, a smart TV may include a DRAM for buffering display data. The larger the buffer is, the longer the "release time" is required. "Release time" is the time taken to free secure buffer as non-secure buffer. Secure buffer is used for buffering secure and valuable content while non-secure buffer is used for buffering non-secure and normal content. By convention the action of "freeing secure buffer" is done by overwriting the data in the secure buffer with specific pattern, e.g. all zeros, or random values. And then release the permission of such buffer to non-secure domain. When the resolution of secure content is higher, e.g. 8K or above resolution, the required size of secure buffer is bigger and the release time becomes longer. This long release time may lead to a delay when end users switch channels or programs on TV. This delay has turned out a bad watching experience to end users.

SUMMARY OF THE INVENTION

An aspect of the present invention discloses data secure method, applied to a storage device, and performed by a controller of the storage device. The data secure method comprises: receiving a buffer clear command from an external processing unit, wherein the buffer clear command indicates that a first secure area corresponding to a first physical address range of a buffer memory of the storage device is required to be cleared, and a first secure key is corresponding to the first secure area for accessing the first secure area; and in response to the buffer clear command, configuring a secure unit of the storage device to cause the secure unit to use one or more second keys different from the first secure key when accessing the first physical address range.

Another aspect of the present invention discloses a storage device, including a buffer memory, a secure unit and a controller. The buffer memory comprises a first physical address range defined as a first secure area. The secure unit is coupled to the buffer memory, and comprising a first secure key for accessing the first secure area. The controller is coupled to the buffer memory, and configured to: receive a buffer clear command from an external processing unit, wherein the buffer clear command indicates that the first secure area is required to be cleared; and in response to the buffer clear command, configure the secure unit to cause the secure unit to use one or more second keys different from the first secure key when accessing the first physical address range.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
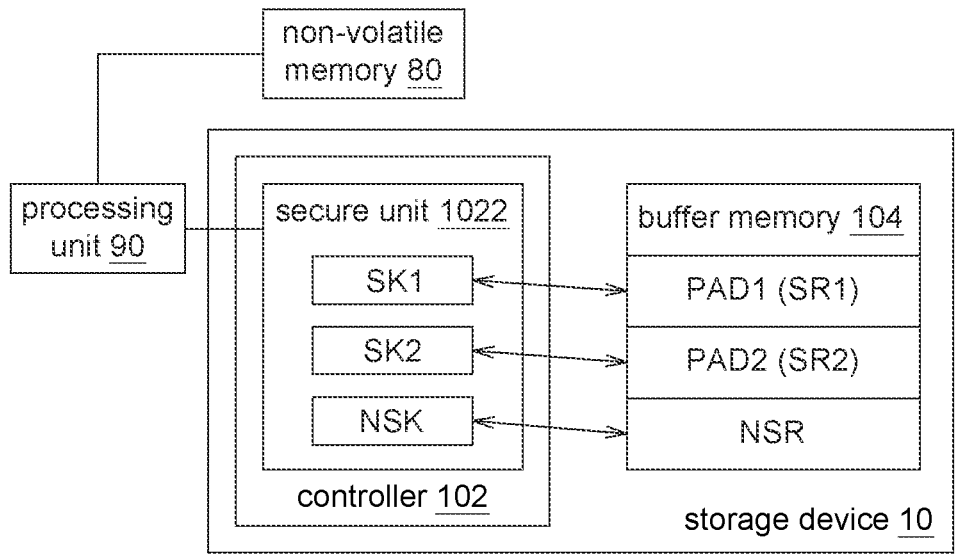
FIG. 1 shows a block diagram of an electronic device according to an embodiment of the present invention.

Referring to FIG. 1, FIG. 1 shows a block diagram of a storage device according to an embodiment of the present invention. The storage device 10 includes a controller 102, a secure unit 1022 and a buffer memory 104. The buffer memory 104 is coupled to the controller 102. The controller 102 is configured to perform various operations, for example, read operation and write operation, on the buffer memory 104. The buffer memory 104 may be a dynamic random access memory (DRAM). The controller 102 may be implemented by an integrated circuit (IC) chip. In this embodiment, the controller 102 includes the secure unit 1022. That is, the secure unit 1022 is integrated with the controller 102. In an alternative embodiment, the secure unit 1022 is a logical circuit independent from the controller 102, and is coupled between the controller 102 and the buffer memory 104. The detail of the secure unit 1022 may be described hereafter.

The controller 102 may be coupled to a processing unit 90. The processing unit 90 may be a center processing unit (CPU), a microprocessor, a general purpose processor or a special purpose processor. A non-volatile memory 80 may be coupled to the processing unit 90. The non-volatile memory may be a hard disk, a flash memory or a solid-state disk (SSD), which is used for storing data and one or more applications.

In an embodiment, the security unit 1022 is configured to scramble the data to be buffered transmitted from the processing unit 90 to the buffer memory 104, and to descramble the data transmitted from the buffer memory 104 to the processing unit 90.

An electronic device may include the storage device 10, the processing unit 90 and the non-volatile memory 80. The electronic device may be a smart phone, a personal computer, a smart TV, an all-in-one computer and so on. For example, the electronic device is a smart TV. When an end user watches a first channel on the electronic device by an executed application, for example, Youtube, stored in the non-volatile memory 80, the buffer memory 104 may be used to temporally store the video data to be displayed. While the end user switches from the first channel to a second channel, the video data stored in the buffer memory 104 generally needs to be cleared. In one case, a first content of the first channel may be a secure content or a protected content, and a second content of the second channel may be a non-secure content or an unprotected content. In another case, the first channel and the second channel do not trust each other. In such cases, since the first content stored in the buffer memory 104 is protected, or the second channel is not trusted by the first channel, the buffered first content in the buffer memory 104 should be cleared while end the user switches from the first channel to the second channel. A data security method according to the present invention provides a method that could quickly clear the data buffered in the buffer memory 104.

In an embodiment, the buffer memory 104 may include one or more secure areas. For example, a first physical address range PAD1, which includes one or more physical addresses, is defined as a first secure area SR1, and a second physical address range PAD2, which includes one or more physical addresses, is defined as a second secure area SR2. Furthermore, the buffer memory 104 may also include a non-secure area NSR which includes at least a part of physical addresses that do not belong to the first secure area SR1 and the second secure area SR2. In an embodiment, the first secure area SR1, the second secure area SR2 and the non-secure area NSR may be defined by the processing unit 90 or the controller 102. For example, in an embodiment, the processing unit 90 defines the secure areas for the buffer memory 104, and the controller 102 may save a secure area configuration recording a relationship between the physical addresses and the secure areas sent by the processing unit 90. The secure unit 1022 may have different keys respectively corresponding to the secure areas and the non-secure area. For example, a first secure key SK1 is corresponding to the first secure area, a second secure key SK2 is corresponding to the second secure area, and a non-secure key NSK is corresponding to the non-secure area. That is, each of the secure areas and non-secure area corresponds to a unique key. The first secure key SK1 is used to scramble the data written by the processing unit 90 to the first secure area SR1, and to descramble the data read from the first secure area SR1 by the processing unit 90. The second secure key SK2 is used to scramble the data written by the processing unit 90 to the second secure area SR2, and to descramble the data read from the second secure area SR2 by the processing unit 90. The non-secure key NSK is used to scramble the data written by the processing unit 90 to the non-secure area NSR, and to descramble the data read from the non-secure area NSR by the processing unit 90. The first secure key SK1, the second secure key SK2 and the non-secure key NSK may be generated and configured by the processing unit 90 or the controller 102. In an embodiment, these keys may be associated to the areas and recorded in the secure area configuration.

Figure 2:
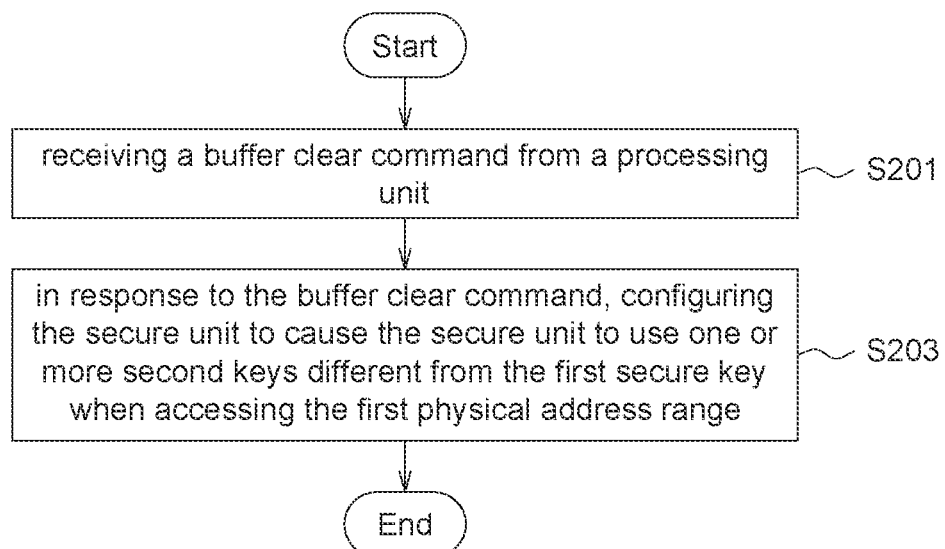
FIG. 2 shows a flowchart of a data secure method according to an embodiment of the present invention.

Referring to FIG. 2, FIG. 2 shows a flowchart of the data secure method according to an embodiment of the present invention. The data secure method is performed by the controller 102. In the embodiment of the smart TV, an end user executes an application such as Youtube to play the first content provided by the first channel on the smart TV. The first secure area SR1 corresponding to the first physical address range PAD1 may be used to buffer the video data.

In S201, the controller 102 receives a buffer clear command from the processing unit 90. In an embodiment, the buffer clear command may be triggered by an operation of the application. For example, when the end user switches the watched channel from the first channel to a second channel, in response to the operation of channel switching, the processing unit 90 may send the buffer clear command to the controller 102 according to a security policy of the first channel. However, in an alternative embodiment, the processing unit 90 could send the buffer clear command while there is a need of buffer clearing. The buffer clear command may indicate that the first secure area SR1 is required to be cleared.

In S203, in response to the buffer clear command, the controller 102 configures the secure unit 1022 to cause the secure unit 1022 to use one or more second keys different from the first secure key SK1 when accessing the first physical address range PAD1. Since the data stored in the first physical address range PAD1 is scrambled by using the first secure key SK1, the secure unit 1022 may not be able to correctly descramble the data stored in the first physical address range PAD1 by using the one or more second keys. That is, by changing the key used to accessing the first physical address range PAD1, the data stored in the first physical address range PAD1 is equivalent to being cleared. In an embodiment, the one or more second keys could be generated by the processing unit 90. In this case, the one or more second keys could be transmitted to the controller 102 with the buffer clear command, or after the buffer clear command. In another embodiment, the one or more second keys could be generated by the controller 102.

Figure 3:
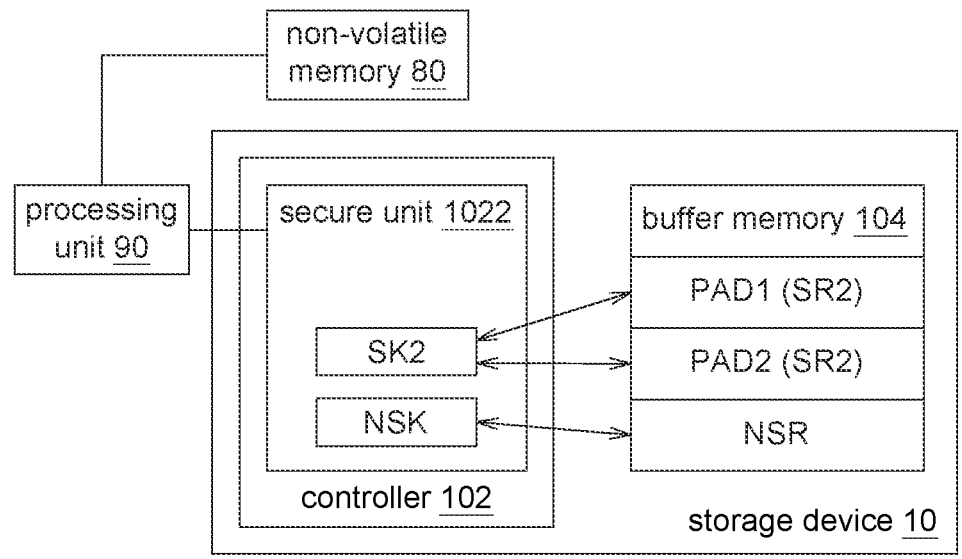
FIG. 3 shows a schematic diagram of clearing the data buffered in the buffer memory according to an embodiment of the present invention.

The controller 102 could configure the secure unit 1022 to cause the secure unit 1022 to use the one or more second keys different from the first secure key SK1 when accessing the first physical address range PAD1 by applying various means. In an embodiment, as shown in FIG. 3, the processing unit 90 redefines the first physical address range PAD1, and generates the one or more second keys for the first physical address range PAD1. For example, the processing unit 90 destroys the first secure area SR1, redefines the second secure area SR2 to include the first physical address range PAD1, and notifies the new secure area configuration to the controller 102. According to the new secure area configuration, the controller 102 could configure the secure unit 1022 to destroy the first secure key SK1 and then change the key corresponding to the first physical address range PAD1 from the first secure key SK1 to the second secure key SK2 since the first physical address range PAD1 now belongs to the second secure area SR2. Since the data stored in the first physical address range PAD1 scrambled by the first secure key SK1, it could not be descrambled by using the second secure key SK2.

Figure 4:
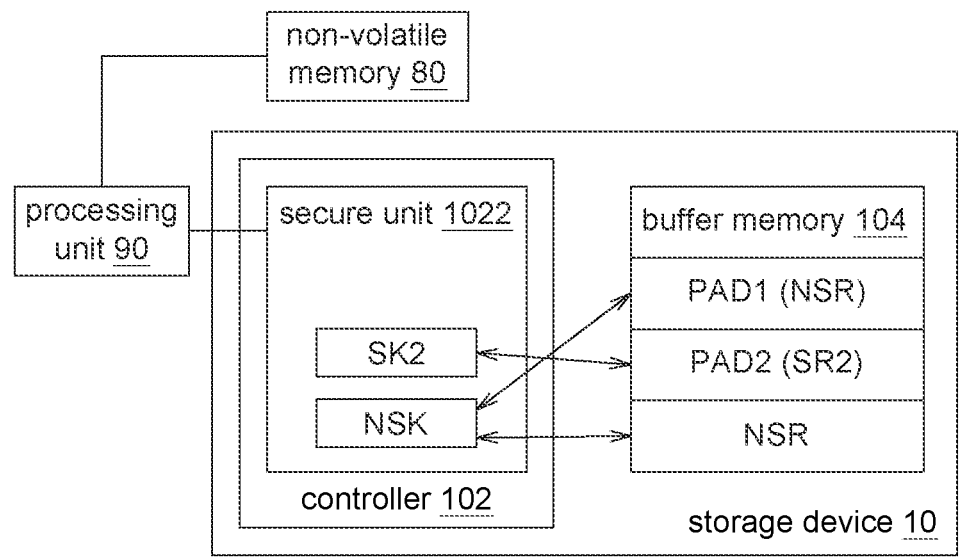
FIG. 4 shows a schematic diagram of clearing the data buffered in the buffer memory according to another embodiment of the present invention.

In another embodiment, as shown in FIG. 4, the processing unit 90 destroys the first secure area SR1 so that the first physical address range PAD1 belongs to the non-secure area NSR. The new secure area configuration may be notified to the controller 102 by the processing unit 90. The controller 102 could configure the secure unit 1022 to destroy the first secure key SK1 and correspond the first physical address PAD1 to the non-secure key NSK according to the new secure configuration. Since the first physical address range PAD1 belongs to the non-secure area NSR after redefining and configuration, the secure unit 1022 may access the first physical address range PAD1 by using the non-secure key NSK. Thereby, the data stored in the first physical address range PAD1 scrambled by the first secure key SK1 could not be descrambled by using the non-secure key NSK.

Figure 5:
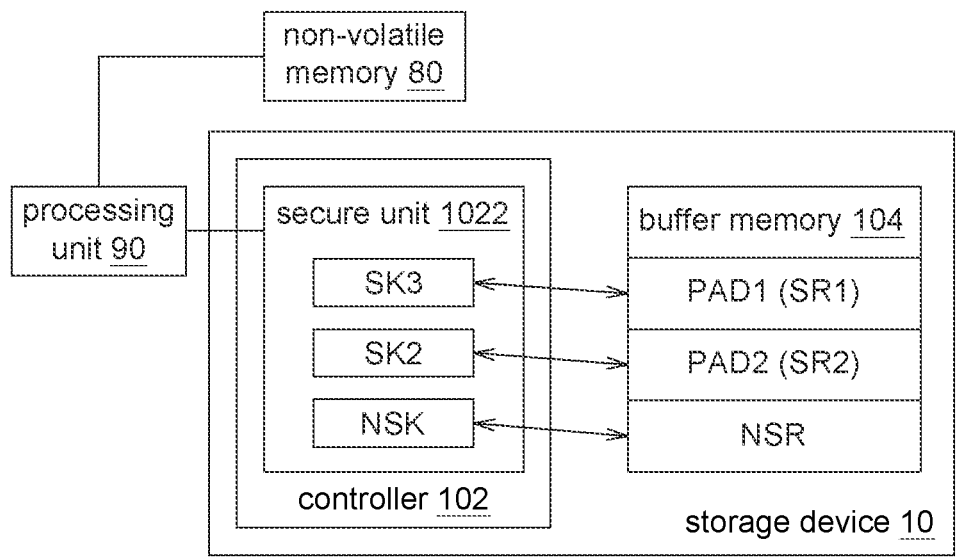
FIG. 5 shows a schematic diagram of clearing the data buffered in the buffer memory according to yet another embodiment of the present invention.

In yet another embodiment, as shown in FIG. 5, the processing unit 90 or the controller 102 removes the first secure key SK1, and generates a new first secure key SK3 (i.e., the second key) different from the first secure key SK1 to replace the first secure key SK1 to correspond to the first secure area SR1. The new first secure key SK3 may be recorded in the new secure area configuration, and the new secure configuration may be transmitted to the controller 102 if the new first secure key SK3 is generated by the processing unit 90. Thereby, the data stored in the first physical address range PAD1 scrambled by the first secure key SK1 could not be descrambled by using the new first secure key SK3. Noted that, in this embodiment, the arrangement of the secure ranges is not necessary to be changed.

It should be noted that the above method is not limited to be applied to a smart TV.

Conventionally, clearing the data stored in the buffer memory may require writing a specific pattern such as all "1" or all "0". Since the write operation takes time, the conventional method consumes a lot of time for buffer clearing. As the size of the buffer memory grows larger, the latency for clearing the buffer memory may increase. With the present invention, the buffer memory could be cleared without the operation of writing a specific pattern. In this way, clearing the buffer memory may not cause a great latency.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data secure method, applied to a storage device, and performed by a controller of the storage device, the data secure method comprising:
   receiving a buffer clear command from an external processing unit, wherein the buffer clear command indicates that a first secure area corresponding to a first physical address range of a buffer memory of the storage device is required to be cleared, and a first secure key is corresponding to the first secure area for accessing the first secure area; and
   in response to the buffer clear command, configuring a secure unit of the storage device to cause the secure unit to use one or more second keys different from the first secure key when accessing the first physical address range.

2. The data secure method according to claim 1, wherein in the step of configuring the secure unit of the storage device to cause the secure unit to use one or more second keys different from the first secure key when accessing the first physical address range, the controller removes the first secure area and redefines a second secure area corresponding to a second physical address range to include the first physical address range, and configures the secure unit to cause the secure unit to use a second secure key corresponding to the second secure area as the one or more second keys for accessing the first physical address range.

3. The data secure method according to claim 1, wherein in the step of configuring the secure unit of the storage device to cause the secure unit to use one or more second keys different from the first secure key when accessing the first physical address range, the controller removes the first secure area so that the first physical address range belongs to a non-secure area, and configures the secure unit to cause the secure unit Q use a non-secure key as the one or more second keys for accessing the first physical address range.

4. The data secure method according to claim 1, wherein in the step of configuring the secure unit of the storage device to cause the secure unit to use one or more second keys different from the first secure key when accessing the first physical address range, the controller changes the first secure key to a new first secure key to correspond to the first secure area, and configures the secure unit to cause the secure unit Q use the new first secure key for accessing the first physical address range.

5. A storage device, comprising:
   a buffer memory, comprising a first physical address range defined as a first secure area;
   a secure unit, coupled to the buffer memory, and comprising a first secure key for accessing the first secure area; and
   a controller, coupled to the buffer memory, and configured to:
   receive a buffer clear command from an external processing unit, wherein the buffer clear command indicates that the first secure area is required to be cleared; and
   in response to the buffer clear command, configure the secure unit to cause the secure unit to use one or more second keys different from the first secure key when accessing the first physical address range.

6. The storage device according to claim 5, wherein the buffer memory further comprises a second physical address range which is defined as a second secure area, the secure unit further comprises a second secure key corresponding to the second secure area, and in configuring the secure unit to cause the secure unit to use one or more second keys different from the first secure key when accessing the first physical address range, the controller removes the first secure area and redefines the second secure area to include the first physical address range, and configures the secure unit to cause the secure unit Q use the second secure key as the one or more second keys for accessing the first physical address range.

7. The storage device according to claim 5, wherein the buffer memory further comprises a non-secure area, the secure unit further comprises a non-secure key corresponding to the non-secure area, and in configuring the secure unit to cause the secure unit to use one or more second keys different from the first secure key when accessing the first physical address range, the controller removes the first secure area so that the first physical address range belongs to the non-secure area, and configures the secure unit to cause the secure unit Q use the non-secure key corresponding to the non-secure area as the one or more second keys for accessing the first physical address range.

8. The storage device according to claim 5, wherein in configuring the secure unit to cause the secure unit to use one or more second keys different from the first secure key when accessing the first physical address range, the controller changes the first secure key to a new first secure key to correspond to the first secure area, and configures the secure unit to cause the secure unit to use the new first secure key for accessing the first physical address range.

* * * * *